United States Patent
Atkins et al.

(10) Patent No.: US 6,784,787 B1
(45) Date of Patent: Aug. 31, 2004

(54) IDENTIFICATION SYSTEM

(75) Inventors: Raymond Catherall Atkins, Pretoria (ZA); Mario Alphonso Marais, Pretoria (ZA); Hendrik Van Zyl Smit, Pretoria (ZA)

(73) Assignee: BTG International Limited, London (GB)

( * ) Notice: Subject to any disclaimer, the term of this patent is extended or adjusted under 35 U.S.C. 154(b) by 0 days.

(21) Appl. No.: 09/570,951

(22) Filed: May 15, 2000

Related U.S. Application Data

(63) Continuation of application No. PCT/GB98/03349, filed on Nov. 9, 1998.

(30) Foreign Application Priority Data

Nov. 14, 1997 (GB) .............................................. 9724183

(51) Int. Cl.[7] .............................................. H04Q 5/22
(52) U.S. Cl. ................ 340/10.4; 340/10.31; 340/10.32; 340/10.33; 340/10.2; 340/10.3; 340/539.1; 340/10.42; 342/44; 342/51; 455/44.2
(58) Field of Search ............................ 340/10.4, 10.31, 340/10.32, 10.33, 10.2, 10.3, 539.1, 10.42; 342/44, 51; 455/41.2

(56) References Cited

U.S. PATENT DOCUMENTS

| 5,530,702 A | * | 6/1996 | Palmer et al. ............... 370/445 |
| 5,699,066 A | * | 12/1997 | Marsh et al. ................. 342/44 |
| 5,751,570 A | | 5/1998 | Stobbe et al. |
| 5,966,083 A | * | 10/1999 | Marsh et al. ............ 340/10.42 |

FOREIGN PATENT DOCUMENTS

| EP | 0 467 036 | 1/1992 |
| EP | 0 689 151 | 12/1995 |
| EP | 0 755 026 | 1/1997 |
| EP | 0 779 520 | 6/1997 |

* cited by examiner

*Primary Examiner*—Ario Etienne
*Assistant Examiner*—Yves Dalencourt
(74) *Attorney, Agent, or Firm*—Nixon & Vanderhye PC

(57) ABSTRACT

A method and system for identifying a plurality of transponders in an interrogation involves transmitting an interrogation signal to the transponders and receiving, at a reader, response signals from the transponders. Each transponder period, and alters the maximum length of the waiting period during the interrogation process.

33 Claims, 5 Drawing Sheets

IDENTIFICATION SYSTEM

This application is a continuation of PCT/GB98/03349 filed Nov. 9, 1998.

FIELD OF THE INVENTION

The invention relates to an identification system comprising a plurality of transponders and an interrogator, to the transponders and interrogators themselves and to a method of identifying a plurality of transponders through an interrogation process. The invention further relates to method and apparatus for improving the identification systems disclosed in EP 494,114 A and EP 585,132 A.

BACKGROUND OF THE INVENTION

Identification systems are known in which a plurality of transponders are activated by a power signal (or an "interrogation signal") and then transmit reply signals, usually containing identification data, to a receiver, which forms part of the interrogator. The signals may be transmitted in many ways, including electromagnetic energy, e.g. radio frequency (RF), infrared (IR), and coherent light, and sound, e.g. ultrasound. For example, the transmission may be achieved by actual emission of RF energy by the transponders, or by the modulation of the reflectivity of an antenna of the transponder, resulting in varying amounts of RF energy in the interrogation signal being reflected or back-scattered from the transponder antenna.

A difficulty with such systems is that with a plurality of transponders present, clashes can occur between transmission of different transponders. In general, if the transmissions of two transponders overlap or clash, the transmissions are polluted and therefore lost, since the receiver cannot distinguish the separate transmissions (see FIG. 1). One solution is to provide for each transponder to transmit repeatedly until its entire transmission is successfully received by the interrogator. Various approaches have been taken to addressing this problem, with varying success.

GB 2,116,808 A discloses an identification system in which the individual transponders are programmed to retransmit data in a pseudo-random manner. Timing signals for the transponders in this identification system are derived from a crystal oscillator, thereby making the transponders expensive to manufacture.

EP 467,036 A describes another identification system which uses a pseudo-random delay between transponder data transmissions. In this example, a linear recursive sequence generator is seeded by the transponder identification address to make the pseudo-random delay as random as possible.

EP 161799 A discloses an interrogator/transponder system in which each transponder transmits a reply signal consisting of a uniquely coded identification number. The interrogator then re-transmits the signal it has received and each transponder decodes the signal and checks the data against it's own identification number. In the event that a particular transponder recognizes it's own code, that transponder discontinues the reply signal or adjusts to receive further instructions (all others having shut down). If interference occurs because two or more transponders are transmitting at the same time, the interrogator waits until a valid signal is received.

The systems described in the above which use a random or pseudo-random timing rely on the creation of random or pseudo-random delays in the generation of response signals to ensure that all transponders will eventually be identified by the interrogator. However in some circumstances the frequency of the clashes between transponders is sufficiently high for the number of successful identifications to be drastically reduced, and the overall time taken to identify all the transponders to be undesirably extended.

SUMMARY OF THE INVENTION

According to the present invention there is provided a method, an identification system, a transponder and an integrated circuit as defined by the appended claims.

According to one aspect of the invention there is provided a method of identifying a plurality of transponders in an interrogation comprising transmitting an interrogation signal to the transponders and receiving response signals from the transponders, each transponder being capable of transmitting the response signal at any time during a waiting period, characterised in that each transponder may alter the maximum length of the waiting period during the interrogation process.

According to another aspect of the invention there is provided an identification system comprising an interrogator and a plurality of transponders, the interrogator including a transmitter for transmitting an interrogation signal to the transponders, each transponder including a receiver for receiving the interrogation signal, a transmitter for transmitting a response signal after receipt of the interrogation signal and means for generating the response signal at any time during a waiting period characterised in that each transponder has means for altering the maximum length of the waiting period during interrogation of the transponders by the interrogator.

The transponders may alter the maximum length of the waiting period (the maximum wait time) during the interrogation. If there are too many transponders in the interrogation field and the entire system is heavily congested, the maximum wait time may be increased to increase the chances of an individual transponder transmitting during a quiet time. Conversely, if there are very few transponders in the interrogation field and there are very large quiet periods, the maximum wait time may be reduced to improve the speed of interrogation.

The transponders may dynamically alter the maximum wait time in response to an instruction from the interrogator. Alternatively, the transponders may be adapted to detect either heavy congestion or large quiet periods and alter the maximum wait time accordingly.

The maximum wait time for a group of transponders may be optimized in an initial interrogation, and used, in subsequent interrogations or the appropriate maximum wait time may be determined during an optimisation phase. The transponders may alter the maximum wait time in response to an instruction from the interrogator or in response to external conditions present during the interrogation.

If an instruction from the interrogator is used to alter the maximum wait time, these instructions may take the form of a modulation or other modification of the interrogation signal. Alternatively, these instructions may take the form of separate signals transmitted by the interrogator, for example at a frequency or frequencies which differ from the interrogation signal.

The transponders may increment or decrement the maximum wait time in a number of stages or alter to any length, e.g. number of clock cycles or elapsed time.

Where the transponders are not "switched-off" or otherwise disabled after successful identification and are adapted to retransmit the response signal after the waiting period, the waiting period may be altered after successful identification. Further, when repeated successful identification of a transponder occurs the waiting period may be altered, for example, by repeatedly doubling the period.

It will be appreciated that the alteration of the waiting period impose no limitations on the technique used for determining the actual waiting period employed by a transponder in a particular circumstance. In particular the random and pseudo random transmission and retransmission techniques previously referred to can be used in conjunction with the invention and its preferred features.

Transponders and interrogators, such as those described in EP 494,114 A and EP 585,132 A (the entire contents of which are incorporated herein by reference), may be adapted to produce transponders and interrogators according to the invention. The transponders may be uniquely coded, or several transponders may share the same code.

BRIEF DESCRIPTION OF THE DRAWINGS

A preferred embodiment of the invention will now be described by way of example with reference to the accompanying drawings, in which.

DETAILED DESCRIPTION OF THE INVENTION

Figure 1:
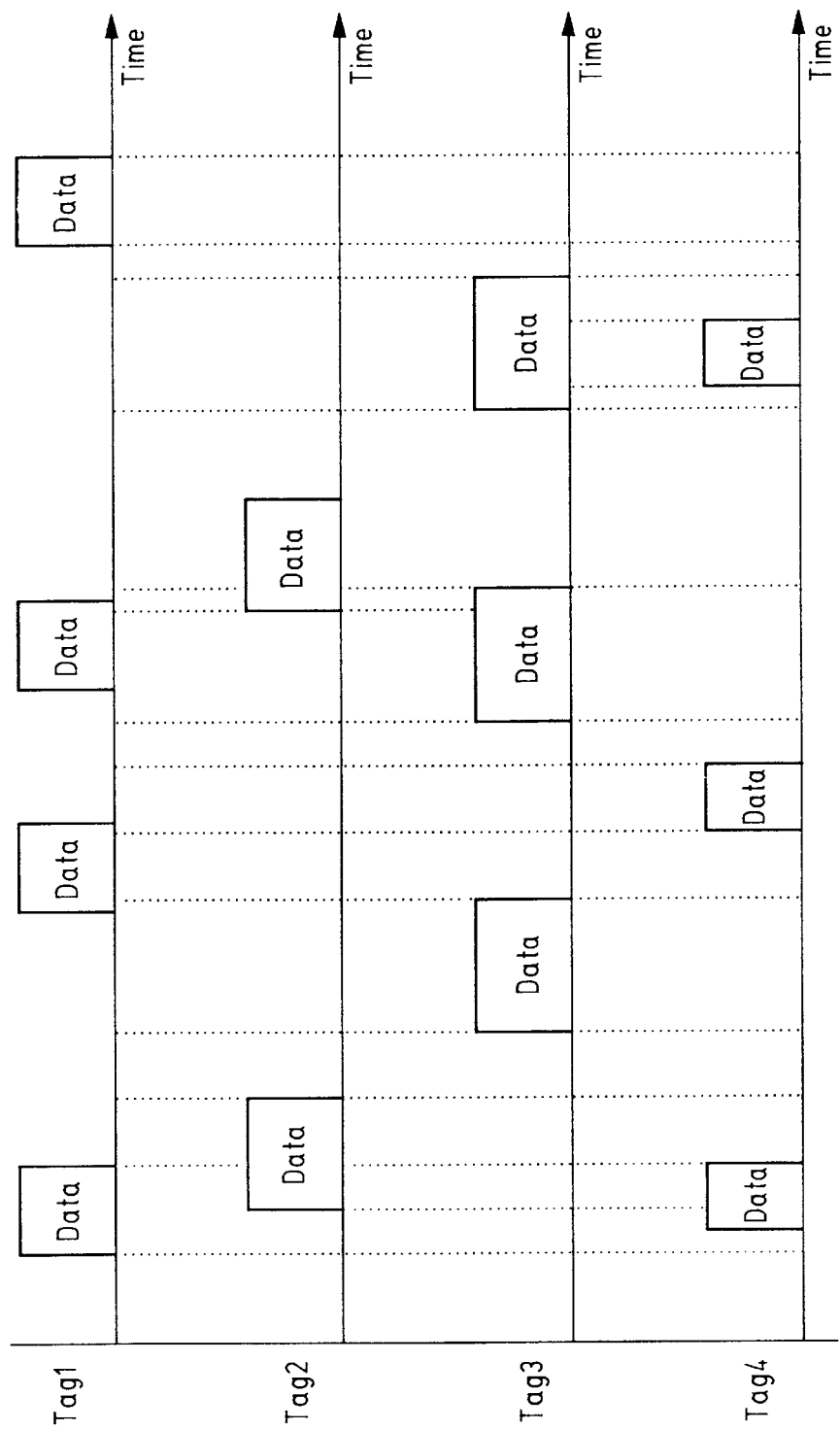
FIG. 1 is a simplified representation of prior art transponder data transmissions.
Figure 2:
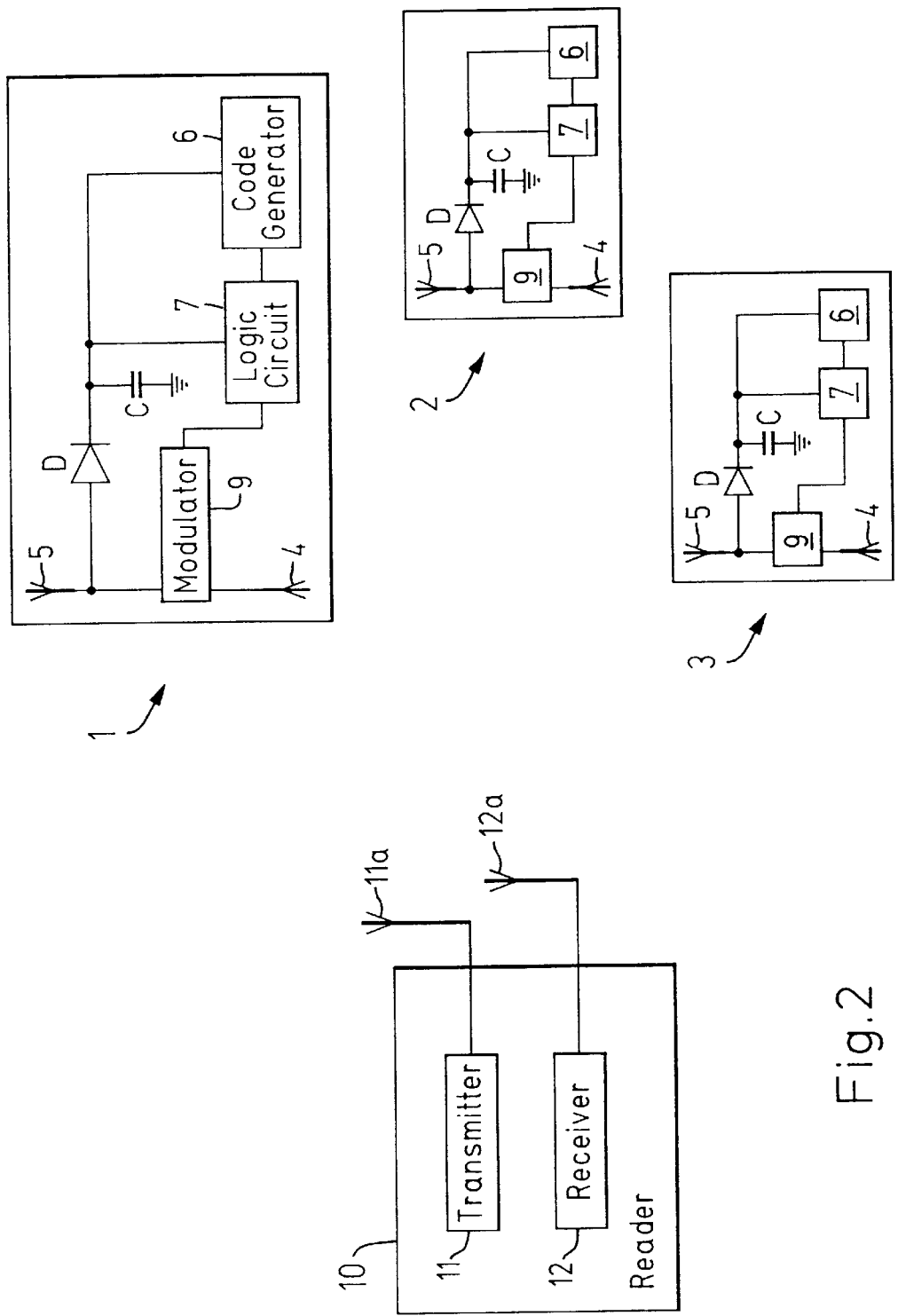
FIG. 2 is a simplified block diagram showing an interrogator and three transponders according to the preferred embodiments of the invention.

Referring to the drawings the preferred embodiment of the invention shown in FIG. 2 is RFID system comprising a reader 10, including a transmitter 11 with a transmitting antenna 11a and a receiver 12 with a receiving antenna 12a. The transmitter (11, 11a) transmits a powering signal (the reader signal) to a number of passive transponders (tag 1, tag 2 and tag 3).

Each transponder includes a dipole antenna, the two poles of which are indicated by 4 and 5. The transponders within the reader field are able to derive a power supply from the energy in the reader signal using the capacitor C and the diode D. The code generator 6 and logic circuit 7 generate a signal using Manchester coding, which is transmitted to the reader, by modulating a portion of the energy received from the reader using the modulator 9 connected between the antenna poles 4 and 5. The transponders have local timing means (as described in detail in EP 585,132 A mentioned above).

Upon successful receipt of a transponder code signal, the reader 10 transmits an acknowledgement signal which disables that transponder, as is described in our earlier patent application EP0494114.

Looking at the operation of the system in more detail, on receiving power each transponder executes a random wait cycle before transmitting its code signal. If the reader detects that too many clashes are occurring, the reader transmits an instruction which may consist of a short gap (a partial or complete interruption) in or other modification of the signal. All active transponders within the reader field (which receive the instruction) alter their maximum random waiting period and restart the waiting cycle. Each transponder can thus be successfully identified in a "quiet" time with reduced noise or interference. Since the transponders have local timing means (as described in detail in EP 585,132 A mentioned above) the timing and the duration of this instruction is synchronised with the local timing means.

Figure 3:
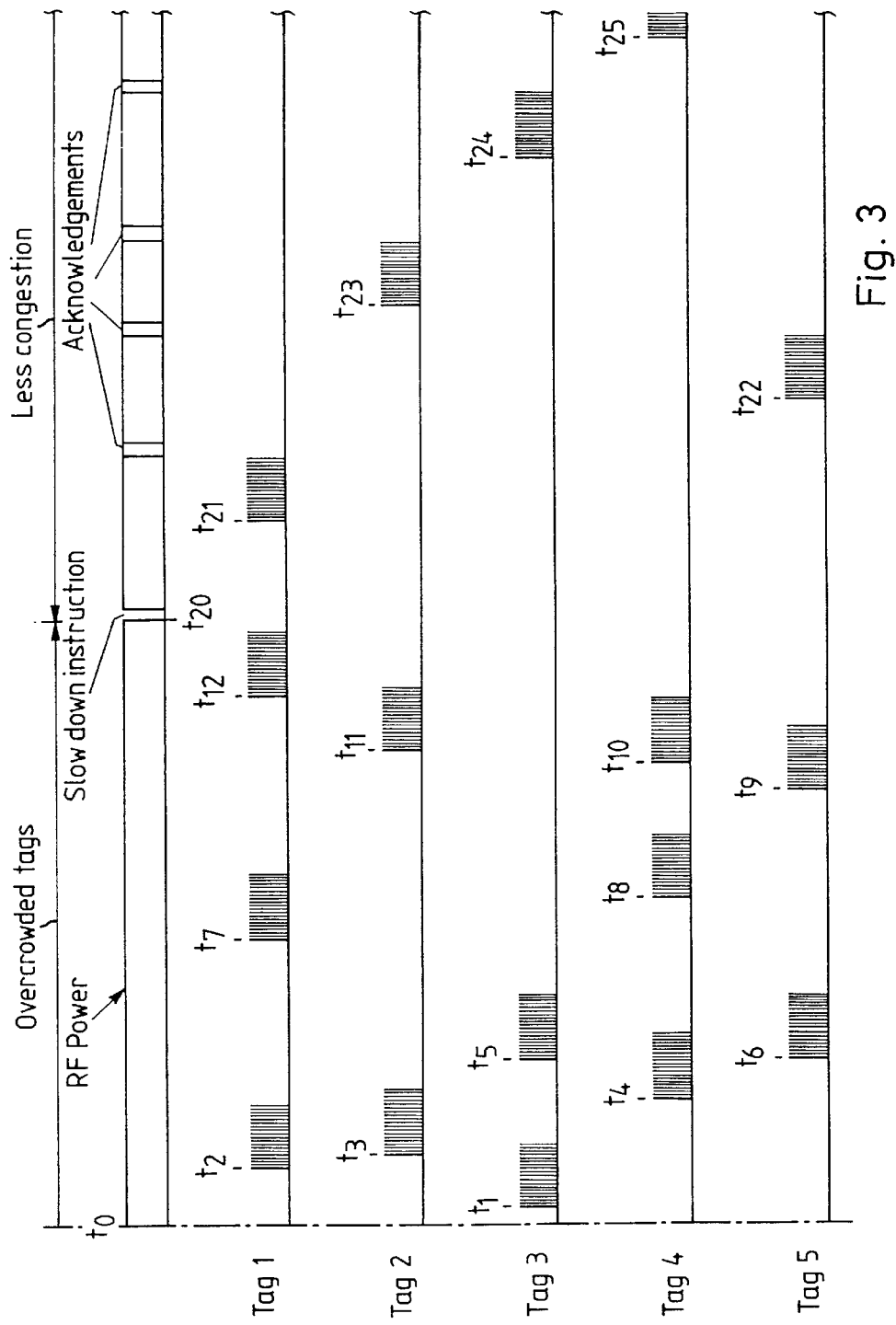
FIG. 3 is a simplified representation of an interrogator and a number of transponders.

FIG. 3 represents the reader signal and the replies from five transponders (tag1 to tag5) and illustrates in simplified terms how conflicts between transponder transmissions can occur, and can be reduced by the preferred embodiment of the invention. The reader signal 20 is powered up a time to, whereupon the transponders within the reader field are powered and begin random wait cycles. In the example shown in FIG. 3, tag 3 first transmits a signal at time $t_1$, tag 1 at $t_2$, tag 2 at $t_3$, and tag 4 at $t_4$.

In the example shown in FIG. 3, the signals from tags 1, 2 and 3 clash so that none can be identified. Tags 1, 2 and 3 restart a respective random wait cycle and the retransmission from Tags 3 at $t_5$ clashes with the first transmission from tag 4 at $t_4$. Further clashes occur and the reader sensing the high number of clashes transmits a "slow down" instruction at 21 which the transponders respond to by doubling the maximum period of their waiting cycle. The transponders still retransmit at a random time within the waiting cycle, but as the maximum waiting cycle has been doubled the probability of clashes at a particular time is reduced. This is illustrated by the subsequent successfully retransmission of the tags 1 to 5 at times $t_2$ to $t_{25}$, without clashes occurring.

Figure 4:
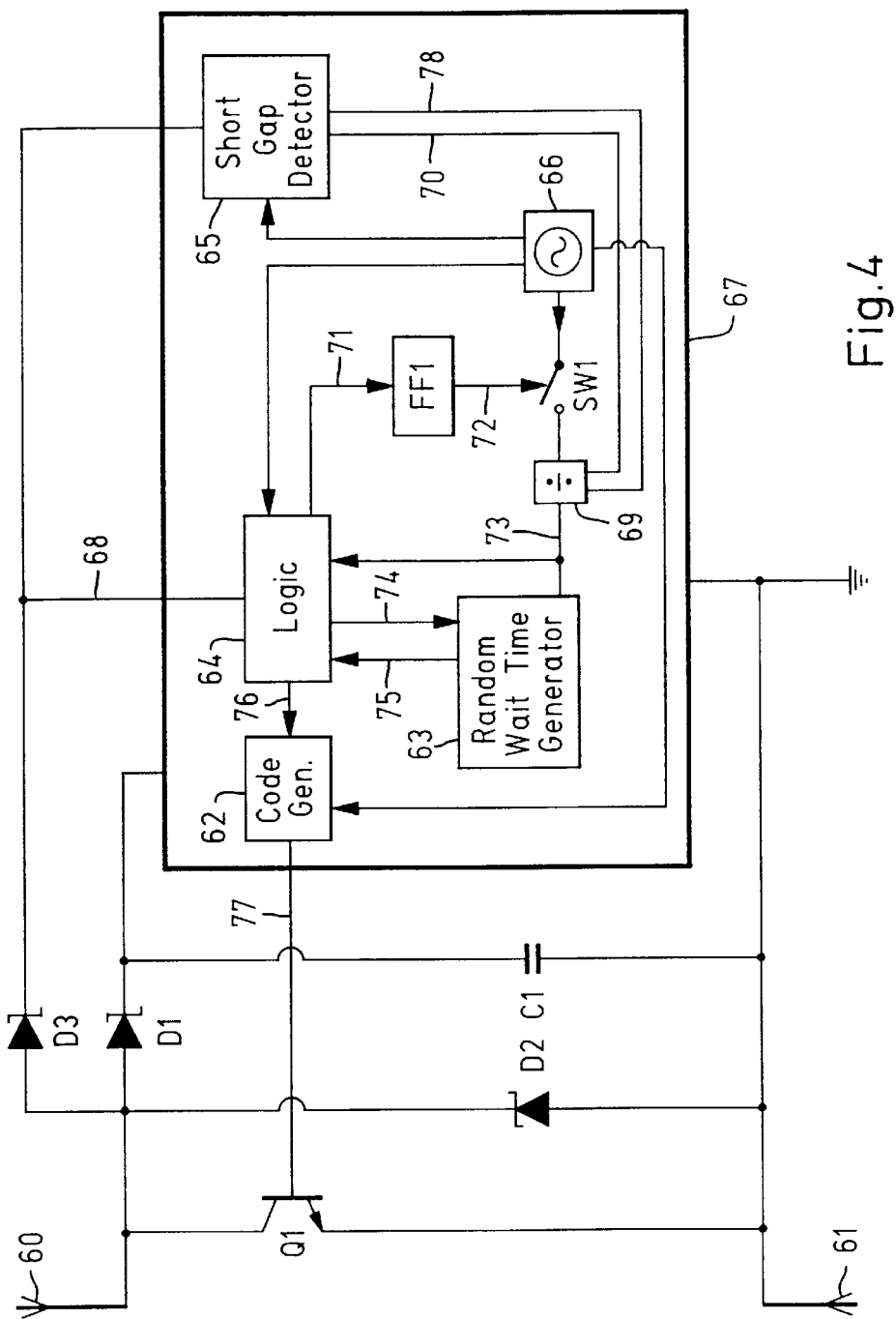
FIG. 4 is a block diagram of a transponder according to the preferred embodiment of the invention.

FIG. 4 shows, in outline, transponder in the form of a tag for use in a system of this preferred embodiment. The tag includes a dipole antenna, the poles of which are shown as 60 and 61. A code generator 62, when enabled by a logic circuit 64 modulates a transistor Q1 with a code, using Manchester coding (signal 77). The timing for the code generator is derived from a local oscillator 66. Diodes D1 and D2 in combination with a capacitor C1 supply the power for tag. The oscillator is disconnected from the random wait time generator when FF1 is in the reset state (signal 72). FF1 is set only when the tag is powered up and resets when the tag is switched off after being read successfully. When the tag initially receives the reader signal FF1 will be in the set state. On power up the logic circuit 64 triggers the random wait timer 63 to select a random value and begin a countdown.

The gap detector circuit 65 is able to detect the presence or absence of the reader signal by means of diode D3 and, if there is an interruption or gap in the reader signal, the duration of the gap.

A short gap prompts divider 69 to divide by a greater number. Two short gaps in succession will prompt divider 69 to divide by a smaller number. That means the random wait time generator runs slower with a single gap and faster with double short gaps. Long gaps are ignored. The random wait time generator indicates (signal 75) the end of the countdown to the logic circuit 64 which then enables (signal 76) the code generator 62 to modulate transistor Q1 with the code. The logic circuit also inhibits the gap detector circuit for the time tag takes to transmit the signal.

If the reader issues an appropriately timed disable/wake up gap once the transponder signal has been received by the reader free from noise or other interference, the gap is detected by logic circuit 64. Provided that this gap occurs at a predetermined time after the end of the transponder signal, e.g. 5 clock pulse after the end of the code, logic circuit (signal 71) will reset FF1. FF1 (signal 72) disconnect the oscillator until it is reset, in this case after removing the tag from the field and allowing capacitor C1 to discharge sufficiently.

Figure 5:
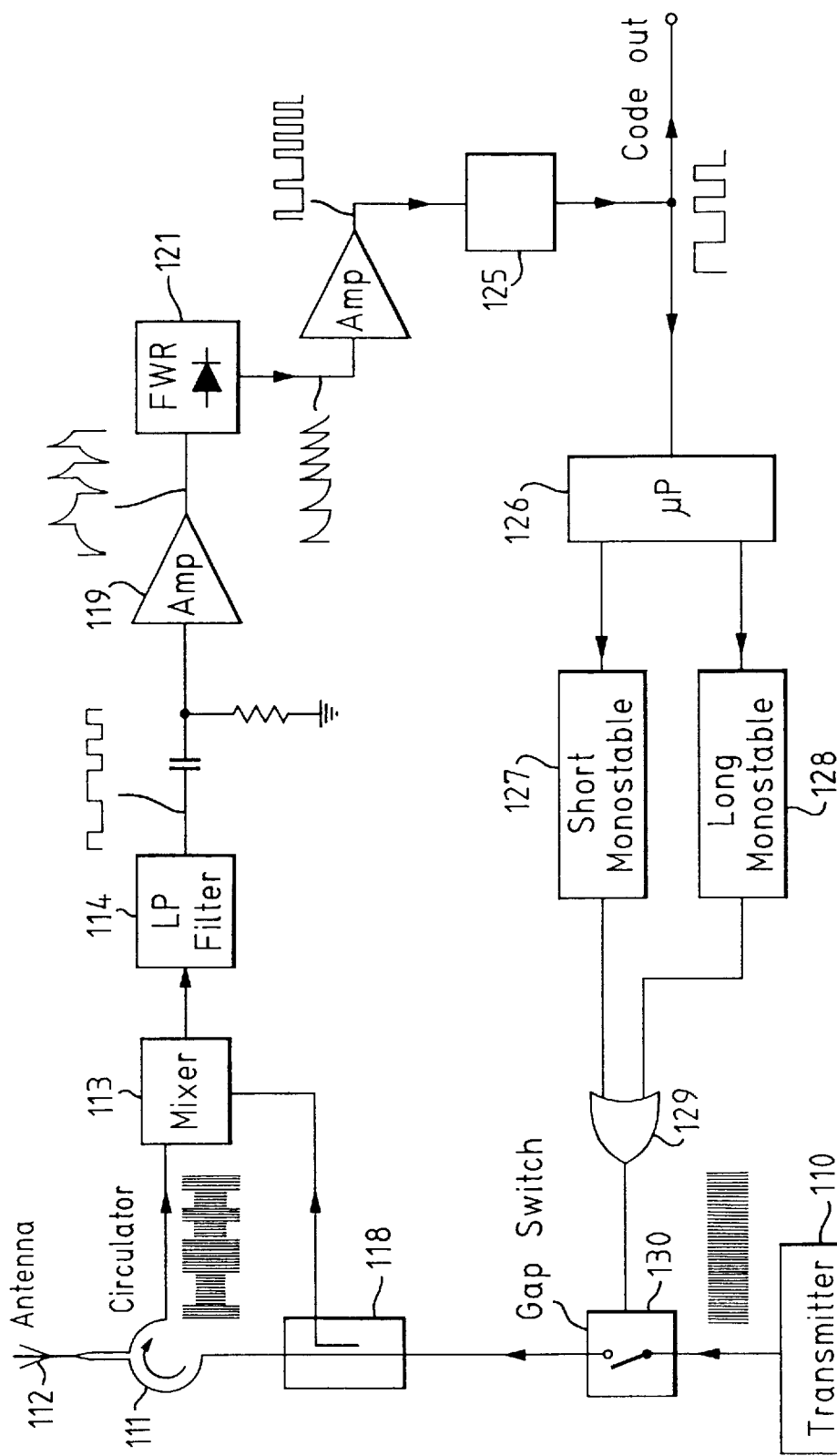
FIG. 5 is a block diagram of a reader according to the preferred embodiment of the invention.

FIG. 5 shows the circuit for the reader. The transmitter 110 produces a reader rf continuous wave signal which is transmitted to the tags via the circulator 111 and the antenna 112. The tag signal is received by the antenna 112 and passed via the circulator 111, to separate it from the transmitter signal, to the mixed 113, which extracts the low frequency code signal, and to the low pass filter 114. The mixers 113 mixes the tag's signal with a portion of the transmitted reader signal extracted by splitter 118 thereby generating the baseband signal which is fed to filter 114. The outputs of the filter is then amplified 119 and full wave rectified 121. The resulting signal is then amplified and passed, via a divide by two circuit 125 to the microprocessor 126. The microprocessor may interrupt the reader signal with either short or long gaps, using either the short monostable 127 or the long monostable 128, the AND gate 129 and switch 130. If the microprocessor finds that too many tag codes are corrupted by other tags, it will automatically send a short gap to reduce the congestion.

In alternative embodiments of the invention the system can be made such that the tag itself can automatically change the random wait time. It first detects the rate of long gaps sent by the reader. This is an indication of the congestion of the system. If this is very low, the system is underutilised. It can then decrease its random wait time by decrementing divider 69. If the tag finds that it does not receive acknowledged after sending its code, it can increase its random wait time by means of divider 69. In the latter case the channel is probably congested.

It will be immediately appreciated by those skilled in the art the functionality of the tags and reader may be achieved in a number of different ways. For example, the tags, instead of deriving power from the reader signal, may be powered by a small battery. The transponder may derive its clock signal from the reader to provide a synchronous system. The system may be implemented to one in a half duplex mode.

In a further alternative embodiment of the invention for systems where transponders instead of being disabled by an acknowledgement signal sent by the reader restart a waiting cycle, the maximum waiting period can be increased, eg by doubling, at each successful identification of a transponder.

What is claimed is:

1. A method of identifying a plurality of transponders in an interrogation comprising transmitting an interrogation signal to the transponders and receiving response signals from the transponders, each transponder being capable of transmitting the response signal at any time during a waiting period, wherein each transponder alters the maximum length of the waiting period during the interrogation process for retransmitting the response signal at a random time during that altered waiting period.

2. An identification system comprising an interrogator and a plurality of transponders, the interrogator including a transmitter for transmitting an interrogation signal to the transponders, each transponder including a receiver for receiving the interrogation signal, a transmitter for transmitting a response signal after receipt of the interrogation signal and means for generating the response signal at any time during a waiting period, wherein each transponder has means for altering the maximum length of the waiting period during interrogation of the transponders by the interrogator for retransmitting the response signal at a random time during that altered waiting period.

3. A system as claimed in claim 2 where transponders dynamically alter the maximum wait time in response to an instruction from the interrogator.

4. A system as claimed in claim 2 wherein the transponders are adapted to detect either heavy congestion or large quiet periods and alter the maximum wait time accordingly.

5. A system as claimed in claim 2 wherein maximum wait time for a group of transponders is optimized in an initial interrogation, and used, in subsequent interrogations.

6. A system as claimed in claim 2 wherein maximum wait time is determined during an optimisation phase.

7. A system as claimed in claim 2 wherein the transponders alter the maximum wait time in response to an instruction from the interrogator or in response to external conditions present during the interrogation.

8. A system as claimed in claim 2 wherein an instruction from the interrogator is used to alter the maximum wait time, and such instructions take the form of a modulation or other modification of the interrogation signal.

9. A system as claimed in claim 2 wherein an instruction from the interrogator is used to alter the maximum wait time, and such instructions take the form of separate signals transmitted by the interrogator.

10. A system as claimed in claim 2 wherein transponders increment or decrement the maximum wait time in a number of stages or alter the maximum wait time to any length.

11. A system as claimed in claim 2 wherein where the transponders are not "switched-off" or otherwise disabled after successful identification and are adapted to retransmit the response signal after the waiting period, the waiting period being altered after successful identification.

12. A system as claimed in claim 11 wherein where repeated successful identification of a transponder occurs, the waiting period is altered, by successively increasing the period.

13. A system as described in claim 12 wherein the period is successively doubled.

14. A transponder including a receiver for receiving an interrogation signal from an interrogator, a transmitter for transmitting a response signal after receipt of the interrogation signal and means for generating the response signal at any time during a waiting period, wherein the transponder has means for altering the maximum length of the waiting period during interrogation by the interrogator for retransmitting the response signal at a random time during that altered waiting period.

15. A transponder as claimed in claim 14, wherein the transponder dynamically alters the maximum wait time in response to an instruction from the interrogator.

16. A transponder as claimed in claim 14, wherein the transponder is adapted to detect either heavy congestion or large quiet periods and alter the maximum wait time accordingly.

17. A transponder as claimed in claim 14 wherein the transponder is adapted to alter the maximum wait time in response to an instruction from the interrogator or in response to external conditions present during the interrogation.

18. A transponder as claimed in claim 14 wherein the transponder is adapted to alter the maximum wait time in response to receipt of instructions in the form of a modulation or other modification of the interrogation signal.

19. A transponder as claimed in claim 14 wherein the transponder is adapted to alter the maximum wait time in response to receipt of instructions in the form of separate signals transmitted by the interrogator.

20. A transponder as claimed in claim 14 wherein the transponder increments or decrements the maximum wait time in a number of stages or alters the maximum wait time to any length.

21. A transponder as claimed in claim 14 wherein, where the transponder is not "switched-off" or otherwise disabled after successful identification and is adapted to retransmit the response signal after the waiting period, the waiting period being altered after successful identification.

22. A transponder as claimed in claim 21, wherein where repeated successful identification of a transponder occurs, the waiting period is altered, by successively increasing the period.

23. A transponder as claimed in claim 22, wherein the period is successively doubled.

24. An integrated circuit for use in a transponder including a receiver for receiving an interrogation signal, a transmitter for transmitting a response signal after receipt of the interrogation signal and means for generating the response signal at anytime during a waiting period, characterised in that there is provided control means for altering the maximum length of the waiting period during interrogation of the transponder by the interrogator for retransmitting the response signal at a random time during that altered waiting period.

25. An integrated circuit as claimed in claim 24, wherein the control means dynamically alter the maximum wait time in response to an instruction from the interrogator.

26. An integrated circuit as claimed in claim 25, wherein the control means is adapted to detect either heavy congestion or large quiet periods and alter the maximum wait time accordingly.

27. An integrated circuit as claimed in claim 24 wherein the control means alters the maximum wait time in response to an instruction from the interrogator or in response to external conditions present during the interrogation.

28. An integrated circuit as claimed in claim 24 wherein the integrated circuit is adapted to alter the maximum wait time in response to receipt of instructions in the form of a modulation or other modification of the interrogation signal.

29. An integrated circuit as claimed in claim 24 wherein the integrated circuit is adapted to alter the maximum wait time in response to receipt of instructions in the form of separate signals transmitted by the interrogator.

30. An integrated circuit as claimed in claim 24 wherein the control means increments or decrements the maximum wait time in a number of stages or alters the maximum wait time to any length.

31. An integrated circuit as claimed in claim 24 wherein, where the transponders are not "switched-off" or otherwise disabled after successful identification and are adapted to retransmit the response signal after the waiting period, the control means alters the waiting period after successful identification.

32. An integrated circuit as claimed in claim 31, wherein where repeated successful identification of a transponder occurs, the control means alters the waiting period by successively increasing the period.

33. An integrated circuit as claimed in claim 32, wherein the period is successively doubled by the control means.

* * * * *